United States Patent [19]

Hilton et al.

[11] 4,320,009

[45] Mar. 16, 1982

[54] PROCESSED ANTHOCYANIN PIGMENT EXTRACTS

[75] Inventors: Barney W. Hilton, Dallas; Robert I. Lin, Irving; Michael G. Topor, Farmer's Branch, all of Tex.

[73] Assignee: Frito-Lay, Inc., Dallas, Tex.

[21] Appl. No.: 17,824

[22] Filed: Mar. 5, 1979

Related U.S. Application Data

[63] Continuation of Ser. No. 818,721, Jul. 25, 1977, abandoned.

[51] Int. Cl.$^3$ .............................................. B01D 13/00
[52] U.S. Cl. .................................. 210/651; 210/663; 426/271; 426/495; 426/540; 426/650
[58] Field of Search ................. 210/23 F, 22, 24, 259, 210/321 A, 321 R, 433 M, 651, 663; 260/369; 426/15, 495, 650, 540, 250, 271; 106/288 Q

[56] References Cited

U.S. PATENT DOCUMENTS 3,634,128  1/1972  Bolin ................................ 210/23 F

FOREIGN PATENT DOCUMENTS 50-103526  8/1975  Japan ...................................... 210/24

OTHER PUBLICATIONS

Porter, et al., "Membrane Ultrafiltration", from Chem. Tech., Jan., 1971, pp. 56-63.
Merson, et al., "Reverse Osmosis for Food Processing", from Paper Presented at Bristol, England, pp. 179-201, 8 Apr., 1968.

*Primary Examiner*—Frank A. Spear, Jr.
*Attorney, Agent, or Firm*—Bernard, Rothwell & Brown

[57] ABSTRACT

The stability of anthocyanin pigment extracts and food products containing anthocyanin extracts is enhanced by removal from the anthocyanin pigment extracts of nutrients which support yeast growth, constituents which react to produce off-flavor, and constituents which catalyze oxidation. These undesirable materials contained in anthocyanin extracts are removed by subjecting the extracts to ultrafiltration or dialysis to remove low molecular weight components from the extracts. The extracts are also subjected to ion exchange to remove additional of these undesirable constituents. Sufficient of these undesirable constituents can be removed from anthocyanin extracts so that, e.g., carbonated beverages containing the extracts may not support sufficient growth of yeasts to cause the beverages to become hazy and/or have an off-flavor, and so that when the extracts are used to prepare dry beverage powder mixtures after prolonged shelf storage, the mixtures may not obtain an off-flavor. Moreover, the oxidative stability and photostability of the anthocyanin pigment extracts may be enhanced by the process of this invention. Such processed anthocyanin extracts may have higher tinctoral powers, e.g., more brilliant red colors, and are less hygroscopic, and thus they may be suitable for coloring various solid food products including liquid and powder concentrates.

22 Claims, No Drawings

PROCESSED ANTHOCYANIN PIGMENT EXTRACTS

This is a continuation, application Ser. No. 818,721, filed July 25, 1977, now abandoned.

This invention relates to anthocyanin pigment extracts and to food products, especially beverages and liquid or dry beverage concentrate mixtures, containing the extracts, wherein the extracts and food products exhibit enhanced stability, even in the absence of preservatives.

Anthocyanins are among the most widely distributed plant pigments. They have the following essential chromophore structure under acidic conditions:

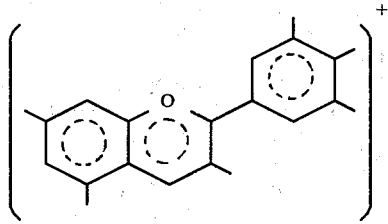

Common chromophores are cyanidin, pelargonidin, delphinidin, peonidin, petundin, and malvidin. Anthocyanin pigments range from brilliant red color to blue color. Usually the pigments contain one to two sugar moieties, e.g., glucose, attaching to the chromophore by glycosidyl linkage. The sugars may or may not be esterified by acetic acid, p-coumaric acid and the like. Anthocyanin pigments are particularly abundant in fruits, e.g., grape, cherry, and apple, and in flowers and contribute significantly to the attractiveness of fruits and flowers. Thus, this association makes anthocyanins ideal colorants for food products, e.g., beverages, provided stability is not a problem.

Soft-drink type beverages, e.g., fruit-flavored beverages, are often organoleptically attractive to the consumer. These beverages frequently include colorants to enhance the appeal of the products to the consumer, and natural colorants such as anthocyanin pigments are particularly attractive since they are readily available and can provide natural beverages, e.g., grape drinks. The soft-drink type beverages are frequently carbonated and bottled or canned in single or multi-portion size containers for storage for consumption at a later, convenient time. Since the beverages are generally stored for significant periods of time prior to consumption, it is highly desirable that the beverages maintain their qualities, e.g., appearance and flavor, over a period of storage.

Potential causes for deterioration of the quality of beverages are the growth therein of microorganisms, e.g., yeasts, and alteration in color. Yeasts are often found as contaminants during bottling of beverages. The growth of yeasts generally results in the formation of a haze or precipitate in the beverages, and the flavor and color of the beverages may be adversely affected. In many beverage compositions, preservatives such as sodium benzoate, sorbates, parabens, and the like, have been employed to inhibit the growth of yeasts and thus stabilize the beverages. The use of preservatives in food products has come upon disfavor, especially to those people who wish to consume only natural food products, and the use of preservatives may even be prohibited by law in some areas. For instance, in Japan the use of sodium benzoate preservatives in carbonated beverages is not permitted. Thus, alternatives are sought to the use of preservatives which would enable the production of natural beverages having acceptable stability. Proposals for enhancing the stability of beverages without the use of preservatives have included pasteurization of the beverage either before or after packaging, or using sterile containers and filtration to remove microorganisms. These proposals have not been met with complete satisfaction due to the high capital expenditures involved, and risk of deterioration in drink quality in pasteurization steps, e.g., color and flavor changes.

Usually, anthocyanins are extracted from grape skin residues after fermentation for wine, or from calyces of roselle flowers (Hibiscus sabdariffa L.). Small scale extraction has been performed on many plants, e.g., miracle fruit (Synsepalum dulcificum), cranberries, strawberries, red onion, pomegranate (Punica granatum) raspberries, blackberries, roses, apples, currants, Cornus canadensis and the berries of cotoneaster, barberry and Vibernum dentatum. Large quantities of commercially available anthocyanin extracts are obtained from steeping grape skin residue from wine fermentation (sometimes from unfermented grape skin), and concentrating to a high solid content, e.g., about 50 to 70 brix, or spray drying with antihygroscopic aids. For example, see Federal Register 4784, Mar. 22, 1966. Such crude anthocyanin pigment extracts often contain other plant metabolites, such as amino acids, peptides, nucleotides, vitamins (e.g., biotin), organic acids and various saccharides, as well as trace metals, and thus the crude extracts often provide the essential nutrients for yeast growth. If the extracts are used in beverages under nonsterile conditions, yeasts thrive, and a haze and/or a precipitate can form. The beverages may also develop an off-flavor.

Other proposals for extraction of pigments may be found in, for instance, A. J. Shrinkhande, *CRC Rev. Food Sci. Nut.*, 7, 193 (1976); P. Markakis, *CRC Rev. Food Sci. Nut.*, 5, 437 (1974); L. Jurd, in *The Chemistry of Plant Pigments*, C.O. Chichester Ed., Academic Press, 123 (1974); G. Hrazdina, *Lebensm. Wiss. U. Technol.*, 7, (1974); J. B. Harbone, *Comparative Biochemistry of the Flavonoids*, Academic Press (1976); C. F. Timberlake et al., *The Flavonoids*, Ed. by J. B. Harborne, Academic Press, Vol. 1, p. 214 (1975); *Chemistry and Biochemistry of Plant Pigments*, Ed. by T. W. Goodwin, Academic Press (1976); and T. Fuleki, et al., *Journal of Food Science*, 33, 78–83 and 266–274 (1968). One group of extraction procedures comprises homogenizing anthocyanin-containing tissues in an aqueous alcohol or acidified alcohol medium, absorption of the pigments onto an ion exchange resin, elution from the resin, and if, necessary, further chromatographied on paper or a thin layer of silica gel. See, for instance, Chiroboga, et al., "Ion Exchange Purified Anthocyanin Pigments as a Colorant for Cranberry Juice Cocktail", *Journal of Food Science*, 38, 464–467 (1973); Francis, "Anthocyanin as Food Colors" *Food Technology*, 29, 52, 54 (1975); and Philip, U.S. Pat. No. 3,963,700. Recently a technique has been developed where a crude anthocyanin extract is run through a polyvinylpyrrolidone column. The pigments are absorbed on the column and eluted afterward as a purified product. See, for instance, Hrazdina, *Journal of Agriculture and Food Chemistry*, 18, 243–245 (1970) and R. E. Wrolstad, et al., *Journal of*

*Chromatography*, 55, 405–408 (1971). However, these methods are not economical for commercial scale purification of anthocyanin extracts.

By this invention, it has been found that the stability of anthocyanin pigment extracts and food products containing anthocyanin pigment extracts can be enhanced by removal from the extracts of nutrients which support yeast growth and undesirable materials which enhance pigment decomposition. In accordance with this invention, anthocyanin pigment extracts are subjected to ultrafiltration or dialysis to remove such nutrients and undesirable materials which are of low molecular weight. The process of this invention is particularly suited for treating anthocyanin pigments which may be pH, temperature, light or oxidation sensitive. Moreover, food products including carbonated or other beverages, prepared using the treated anthocyanin pigment extracts of this invention may exhibit sufficient stability that the use of preservatives or the sterilization of the food products may often be unnecessary and off-flavor development and color alteration during storage may be minimized. Moreover, a haze may not form in beverages prepared using the treated anthocyanin pigment extracts of this invention.

Anthocyanin pigment extracts which may be processed in accordance with this invention include extracts from biological sources such as plants, and thus often contain nutrients for yeast growth. These nutrients frequently include phosphorous, potassium, magnesium, silicon, sulfur, sodium, calcium, iron, nitrogenous compounds, and the like. The reduction of the essential nutrients for yeast growth in the natural colorant extracts to levels below that which the yeast growth would unduly deleteriously affect the colorants or food products in which the extracts are incorporated, is accomplished by process of the present invention. Accordingly, the anthocyanin extracts are treated by ultrafiltration (diafiltration) or dialysis using a semi-permeable membrane with molecular-size pores, which membrane serves to remove or significantly reduce low molecular weight nutrients and other undesirable components such as nitrogenous compounds and minerals or components of an ash fraction of the extracts, by passage through the membrane as permeate and thereby reduces the ability of the extracts to support growth of yeasts. The anthocyanin pigments are concentrated in the retentate fraction during ultrafiltration.

In another aspect of the invention, the anthocyanin pigments are also subjected to ion exchange treatment. Thus the anthocyanin pigment extract can be subjected to ion exchange which may be either or both of cation and anion exchange which serves to remove various cations and/or anions, but not the pigments, from the extract by immobilizing the ions on an exchange medium such as a resin bed. The removal of such ions serves to reduce the ability of the extract to support growth of yeasts. The ultrafiltration or dialysis may precede or follow the ion exchange treatment; however, frequently it is advantageous to conduct ultrafiltration prior to the ion exchange treatment.

The amount of nutrients remaining in the anthocyanin pigment extract resulting from the use of the process of the present invention may vary depending on the intended use of the extract. For instance, if the extract is to be employed in a food product which will subsequently be sterilized, the amount of nutrients removed should be sufficient such that any yeast growth which occurs during storage of the extract is not sufficient to undesirably affect the qualities of the colorant, i.e., sufficient contaminants should be removed from the anthocyanin pigment extract so that the colorant is adequately color stable and is not unduly subject to photo or other decomposition. The anthocyanin pigment may be incorporated into food products without sterilization. While the other constituents of the food product may provide some or all of the essential nutrients required to support yeast growth, sufficient nutrients may be removed from the anthocyanin extract such that the overall amount of at least one of these nutrients is present in an insufficient amount to support undue yeast growth and adversely affect the appearance or flavor of the food product containing the treated extract. In many cases, food products, e.g., beverages, may have insufficient amounts of one or more of the nutrients to support sufficient yeast growth so as to adversely affect properties of the food products, yet anthocyanin pigment extracts which are added to the foods as a colorant, but are not treated in accordance with this invention, may supply the deficient nutrient. For instance, a grape-flavored drink not containing an anthocyanin pigment extract and containing a flavoring agent, caramel, acid, sugar and water, may contain insufficient amounts of nitrogen, phosphorous, magnesium, silicon, calcium and iron to support undue yeast growth; however, the anthocyanin pigment extract may provide over 50 times the phosphorous, over 90 times the calcium, over 300 times the silicon, over 25 times the calcium, and over 5 times the iron required for unduly excessive yeast growth, e.g., over 10 million yeast cells per milliliter.

Typically, the extract to be treated may contain at least about 0.04 weight percent phosphorous, at least about 0.2 weight percent potassium, at least about 0.1 weight percent magnesium, at least about 0.01 weight percent silicon, at least about 0.2 weight percent sulfur, at least about 0.2 weight percent sodium, at least about 0.03 weight percent calcium, at least about 0.04 weight percent iron, and at least about 0.8 weight percent nitrogen on an extract solids basis. Generally, the anthocyanin pigment extract after being treated by ultrafiltration in accordance with this invention may contain less than about 0.03 weight percent phosphorous, less than about 0.5 weight percent nitrogen, and less than about 0.5 weight percent ash, based on pigment solids. When the anthocyanin pigment extract is treated by both ultrafiltration and ion exchange in accordance with this invention, the extract may well contain less than about 0.001 percent calcium, less than about 0.03 percent phosphorous, less than about 0.0001 percent potassium, less than about 0.0002 percent magnesium, and less than about 0.001 percent iron, based on pigment solids. The total ash content of the purified anthocyanin pigment extract of this invention is frequently less than about 0.5 percent, and the nitrogen is often less than about, 0.6, e.g., less than about 0.5, percent based on pigment solids. The purified anthocyanin extract may often contain less than about 0.005 weight percent calcium and less than about 0.005 weight percent iron on a solids basis.

The anthocyanin pigment extracts treated in accordance with this invention may be solid or liquid at ambient temperature, and, if necessary, sufficient water may be added to the colorants to provide pigment extract-containing solutions having a suitable viscosity for processing, i.e., ultrafiltration. Generally, it is desired that the anthocyanin pigment extract contains less than about 15 weight percent insolubles to facilitate processing of the extract in accordance with this invention. Normally liquid extracts are frequently preferred since they may contain relatively little, if any, insolubles. The anthocyanin extracts may often comprise about 0.1 to 50, preferably about 1 to 20, weight percent of the solution for treatment in the process of the invention. Anthocyanin pigments which may be treated in accordance with the invention can include pigments of higher molecular weight, e.g., about 2000 or 5000 or more, which may include substantially dimer and other polymer pigment structures. For instance, the pigment extract being treated may comprise a significant amount, say, about 50 to 90, or more, e.g. about 70, weight percent of anthocyanin pigment having a molecular weight of at least about 5000. Often substantially all of the pigment in the extract has a molecular weight below about 50,000, or even below about 20,000.

The anthocyanin pigment-containing solution is preferably prefiltered to remove insoluble or colloidal substances, for instance, gums, e.g., having a particle size of at least about 1 micron. The prefiltering can be conducted using any suitable filtering means such as filter presses, rotary filters, filtration tanks, and the like, by centrifuging, or, preferably, by precoated filters, e.g., 1 micron cartridge filters coated with Celite 545. Suitable filters may have a pore size of at least about 0.45 microns, say, about 0.75 to 1.25 microns. The anthocyanin pigment passes through the filtering means and is collected as a component in the filtrate, or, when subjected to centrifuging, is present in the supernatant liquid phase.

The ultrafiltration or dialysis of this invention is generally conducted using semi-permeable ultrafiltration or dialysis membranes which retain the anthocyanin pigments on the retentate or concentrate side of the membrane and permit undesirable lower molecular weight components to be eluted with the permeate. The lower molecular weight components which are eluted include low molecular weight organic compounds, e.g., amino acids, mono- and oligosaccharides, organic acids, and dissolved inorganic salts. The semi-permeable membrane frequently has a molecular weight cut-off, i.e., the molecular weight of particles of which theoretically about 90 weight percent are retained on the concentrate side of the membrane, and about 10 weight percent pass through the membrane, in the range of about 2,000 to 20,000, preferably about 5,000 to 15,000, daltons. The feed to the ultrafiltration or dialysis membrane may be at temperatures from about 10° C. to 70° C., e.g., ambient temperature or at a slightly elevated temperature, say from about 30° to 60° C., and preferably about 20° to 30° C. A pressure drop across the membrane is frequently employed to increase the rate of separation. The ultrafiltration can be done utilizing pressurized ultrafiltration apparatus or by dialysis under a pressure generated by the differences in solute concentrations across the membrane. A convenient pressure drop depends on the membrane configuration and frequently the pressure drop is about 2 to 50 pounds per square inch (psi), e.g., with flat sheet membranes such as available from Millipore Corporation. A pressure drop of about 20 psi is often suitable. For hollow fiber cartridges, such as available from the Romicon Company, a pressure drop of about 5 psi is often employed. A portion of the anthocyanin pigments may pass through the membrane and be provided in the permeate. If desired, suitable means such as ultrafiltration using molecular weight 2000 dalton cut-off membranes may be employed to recover the anthocyanin pigments in the permeate.

Advantageously, the pH of the aqueous anthocyanin pigment-containing solution treated in accordance with this invention is adjusted with an acid, e.g., hydrochloric acid, or a dilute base, e.g., sodium hydroxide, to facilitate removal of impurities in the extract by ultrafiltration or dialysis, and/or ion exchange. Generally, the pH of the extract is such that undue oxidation or other undesirable reaction does not occur. This may advise the control of pH and preferably the pH is about 1 to 3.5, although higher pH may be used in a given situation. A pH of about 1.0 to 1.5 has given improved inhibition of yeast growth. At a pH of about 1.0 to 1.5, the ash in a grape skin extract concentrate after ultrafiltration using a membrane having a 10,000 molecular weight cut-off may be less than about 0.5 percent on a colorant solids basis, whereas at a pH of about 2.5 to 3.5, the ash in the concentrate may be greater than this value. Preferably, the pH adjustment is conducted prior to ultrafiltration or dialysis treatment of the extract and may more preferably be conducted prior to the prefiltration.

The concentrate from the ultrafiltration or dialysis contains the colorant and may also contain trace amounts of retained nutrients which can support yeast growth. The concentrate can be treated with an ion exchange material for removal of additional nutrients. The exchange material may contain both fixed and exchangeable ions. Anions or cations, or both, in the extract are immobilized on the material by exchange with its exchangeable ions, and thus removed from the colorant-containing solution. Any suitable ion exchange medium may be employed, and generally, the exchange medium is a solid resin having acidic, e.g., sulfonic, carboxylic, etc., groups or amine groups thereon. The ion exchange groups have the property of combining with or exchanging ions between the exchange material and the extract concentrate. Thus, for instance, in a cation exchange resin bed, a cation such as sodium or calcium is immobilized on the exchange medium by reaction with the fixed anion on the resin bed. Often the ion exchange resin may have up to about 15 or 20 or more percent cross-linking, e.g., about 2 or 3 to 15 percent cross-linking. The ion exchange medium may be in any suitable physical configuration and often is granular or porous. Preferably, the ion exchange resin comprises a strong cationic exchange resin and removes metal-containing cations, amino acids and amines. The amount of ion exchange medium utilized advantageously provides sufficient activity to remove the desired amount of ions from the extract, e.g., sufficient exchange medium may be employed such that the exchangeable ions on the medium are in excess of that required on a stoichiometric basis for exchange with the ionic components in the anthocyanin pigment-containing solution which are capable of combining with the exchange resin. Often the weight ratio of exchange medium to soluble solids in the anthocyanin pigment-containing solution is at least about 0.1 and frequently about 0.5 to 1. If the extract has an unsuitably high viscosity for an ion exchange operation, water, preferably deionized water, can be added to the extract to facilitate passing through the ion exchange medium.

If desired, the anthocyanin pigment extract which has been treated by ultrafiltration or dialysis, or ultrafiltration or dialysis and ion-exchange in accordance with this invention, may be subjected to further ultrafiltration to remove additional low molecular weight components and to concentrate the anthocyanin pigments to facilitate shipping and storage and drying, if dry anthocyanin pigments are sought. The ultrafiltration membrane in this further ultrafiltration often has a lower molecular weight cut-off than that used for the initial ultrafiltration, e.g., about 500 to 5,000, frequently about 1,000 to 2,000, daltons. Some other means for concentrating the purified extract may be employed such as freeze drying and the like.

The anthocyanin pigment extract after treatment in accordance with this invention may be filtered to remove microorganisms and any larger particle size insoluble impurities, e.g., having particle sizes greater than about 0.2, e.g., greater than about 0.45, microns. Suitable filters may have a pore size of about 0.2 microns or larger, say, about 0.20 to 0.45 microns.

The food products which can be colored with the treated anthocyanin pigment extracts of this invention may be solid or liquid, and in an aspect of this invention, the extracts do not provide sufficient nutrients for the undue growth of yeasts to adversely affect the food products, e.g., the yeast count (live and dead) at about 25° C. after about 20 weeks is usually less than about 10 million, often less than about 5 million, per cubic centimeter (per milliliter in liquid food products). The anthocyanin pigment extract provided by this invention may be employed in consumable materials, e.g., beverages, dry or wet concentrates for beverages, capsules, pills, and the like. Frequently, the anthocyanin pigment extracts are employed in beverages, especially in soft drink-type beverages which are carbonated. Often, these contain sugar, flavor extracts, carbonated water, and, frequently, an acid to provide tartness. Other components such as caramel may be used as components in the beverages for desired properties and effects. The amount of the anthocyanin pigment extract employed in the food product is sufficient to impart a desired color intensity and is often about 0.005 to 5, preferably about 0.01 to 1, percent by weight of the product on a water-free basis.

EXAMPLE I

About 5 gallons of an aqueous solution of an anthocyanin pigment extract from grape skins, Meer Lot #46-00610, obtainable from the Meer Corporation, hereinafter referred to as the raw extract, containing about 20 percent solids are diluted to about 10 percent solids with water and the pH of the solution is adjusted to about 1.5 with hydrochloric acid. The pigment solution is prefiltered by recycling for about one-half to one hour through a 1 micron filter (1 micron AMF-Cuno Micro-Wynd II filter) which has been coated with diatomaceous earth (Celite 545, Johns-Mansville Co.). The filtrate is then recycled through a similar filter, but without diatomaceous coating, for one hour to remove any residual diatomaceous earth. The filtrate is then heated to about 45° C. and passed through an ultrafiltration hollow fiber membrane having a molecular weight cut-off of about 10,000 daltons with a pressure drop of about 5 pounds per square inch across the membrane. The temperature of the solution in the ultrafiltration membrane is maintained constant at about 45° C. The permeate flow is about 11 gallons per square foot of membrane per day. Acidified deionized water is added to maintain a constant volume of the concentrate phase. The ultrafiltration is continued until about six volumes of permeate is collected. The concentrate is then further ultrafiltered using a membrane having a cut-off of about 2,000 daltons to concentrate the solution to about 10 weight percent solids. The concentrate from the ultrafiltration is cooled to about 25° C. and then passed through an ion exchange bed. The ion exchange medium is a $H^+$ cation resin (Duolite C25D obtainable from the Diamond Shamrock Chemical Company), and is disposed in two 5-inch diameter cylinders which are five feet long and each contains about 0.4 cubic foot of medium. The flow rate of the solution which is at a pH of about 2 is about 0.6 gallon per minute per cubic foot of resin. The concentrated solids, i.e., product, extract, are analyzed to contain:

| Parts per Million by Weight on Pigment Solids Basis | | |
|---|---|---|
| | Raw Extract | Product Extract |
| Barium | 3.6 | Not detectable |
| Calcium | 724 | 1.2 |
| Chromium | 6.0 | 2.0 |
| Potassium | 4450 | Not detectable |
| Aluminum | 53 | 1.8 |
| Strontium | 46 | 0.1 |
| Nickel | 9.7 | Not detectable |
| Sodium | 3710 | 25 |
| Zinc | 35 | Not detectable |
| Copper | 8.7 | 1.9 |
| Iron | 861 | 2.0 |
| Silicon | 354 | 278 |
| Manganese | 99 | Not detectable |
| Magnesium | 2135 | 0.3 |
| Phosphorous | 917 | 59 |
| % Nitrogen | 1.2 | 0.41 |
| % Ash | 6.9 | 0.24 |

The product extract exhibits good stability and no undue formation of yeast is observed.

EXAMPLE II

The pigment of Example I is employed in a grape flavored carbonated beverage formulation. The grape drink is prepared using about 37.1 grams of granulated sucrose, 0.0773 milliliters of Mirinda Grape extract, 0.333 grams of tartaric acid, 0.0817 milliliters of caramel, and 4.0 volume $CO_2$ carbonated water to make 10 liquid ounces. The amount of pigment employed is about 0.123 grams or a sufficient amount to provide an approximate transmission of 16.5 percent at 520 nanometers.

The beverage is then inoculated with about 30,000 yeast cells per milliliter wherein the yeast inoculum is at least about 60 percent viable. The yeast is *Saccharomyces microellipsoideus*, a commonly found contaminant microorganism in soft drink beverages. The beverage is aged at about 70° to 74° F. and the yeast count is determined using a Levy-Hausser Haemocytometer. The yeast count after 21 days is observed to be about $2.5 \times 10^6$ per milliliter. In comparison, an essentially similar beverage except using the raw extract instead of the product extract treated in accordance with Example I is similarly inoculated and the yeast count after 21 days is observed to be greater than about $50 \times 10^6$ per milliliter.

The photostability of the beverage is determined by exposing the beverage in a glass bottle at 28° C. to cool white light (Sylvania F40WW at about 1000 foot-candles) and periodically measuring the absorbance at 520 nanometers. Generally, the maximum allowable color loss desired in such beverages is about 20 percent. After about 30 or 40 days, the color loss of the beverage using the product extract of Example I stabilized at about 10 percent. On the other hand, an essentially similar beverage except using the raw extract results in a color loss of over 20 percent after 20 to 30 days.

EXAMPLE III

About 4.5 gallons of aqueous liquid grape skin extract from the Meer Corporation (19.7% solids) and 1650 milliliters of 37% hydrochloric acid solution are diluted to 45 gallons with deionized water to form a solution containing 2 percent solids and having a pH of about one. To remove gums and insolubles, the grape skin extract is recirculated for at least 45 minutes through a 1 micron cartridge filter which is pre-coated with diatomaceous earth. The filtrate is then recirculated through an uncoated 1 micron cartridge filter to remove residual diatomaceous earth.

The extract solution filtrate is then batch ultrafiltered with a 21.5 ft.$^2$ 10,000 dalton cut-off ultrafiltration Pelicon membrane (available from Millipore Corporation) at ambient temperature under inlet and outlet pressures of 100 and 90 psig, respectively. The extract is mostly retained by the membrane, and the concentrate is deeply colored while a lightly colored liquid passes through the membrane as permeate. The concentrate is maintained at a volume of 45 gallons and a pH of about one by adding hydrochloric acid-deionized water solution having a pH of one; the addition is continued until 255 gallons of permeate are collected. The addition of the acid solution is stopped, and an additional 20 gallons of permeate are collected and the concentrate is thus concentrated to 25 gallons. The concentrate is then passed through a 0.45 micron filter to remove any microbial contamination.

Carbonated grape drinks are made containing 2.38 volume percent concentrate in essentially the same manner illustrated in Example II. The drinks are inoculated with a yeast, *Saccharomyces microellipsoideus*, a 30,000 cells/ml.; and after 3-week incubation, total yeast count is $0.61 \times 10^6$ cells/milliliter. No haze or sediment is noted.

EXAMPLE IV

A ten-gallon grape skin extract solution containing hydrochloric acid and deionized water is prepared in the same proportions and filtered as in Example III. The solution is batch ultrafiltered with a 26.5 ft.$^2$, 10,000 dalton cut-off hollow-fiber membrane cartridge (Romicon Company). The extract is recirculated at ambient temperature through the membrane cartridge maintaining inlet and outlet pressures of 25 and 20 psig, respectively. The ultrafiltration is carried out at a pH of one and ambient temperature and continued until 60 gallons of permeate are collected. A microbial growth test is conducted as in Example III. The yeast count reveals $3.8 \times 10^5$ yeast cells per milliliter in drinks made with purified grape skin extract. No haze or sediment is observed.

EXAMPLE V

A one-liter solution with the same proportions of grape skin extract and hydrochloric acid is processed at ambient temperatures and microbial tested as in Example III, except using a 1 ft.$^2$ membrane and 4 liters of permeate are collected, and no subsequent 0.45 micron filtration is employed. The microbial tests reveal only $1.7 \times 10^5$ yeast cells per milliliter. No haze or sediment is observed.

EXAMPLE VI

Eighty grams of grape skin extract dry powder from Naarden Company are dissolved in 800 milliliters deionized water. The solution has a pH of 3.3. The solution is centrifuged at about 16,000 times gravitational force for 30 minutes and about 5 grams of precipitate are discarded. The supernatant liquid is ultrafiltered using a stirred cell ultrafiltration unit (Amicon Co.) with a PM 10 membrane (molecular weight cut-off of 10,000 daltons) under 50 psig. of nitrogen. Deionized water is added frequently to replace liquid loss to the permeate phase. The ultrafiltration is continued until the permeate collected equals 3 times the original supernatant liquid volume (2.4 liters). The 0.8 liter final concentrate is first run through an anion exchange column made with 50 g. Amberlite IRA-400, and then a cation exchange column of 100 g. Amberlite IR-124. These resins are conditioned to chloride and hydrogen forms, respectively, in accordance with the procedure described in "Amberlite Ion Exchange Resin—Laboratory Guide", published by the Rohm and Haas Co. The columns are wrapped with black paper and aluminum foil. The effluent from the cation exchange column is used to prepare grape drink and to conduct microbial tests by a method similar to that described in Example III, except no caramel is added, and $CO_2$ content is about 1 to 2 volumes per volume of liquid. The yeast count reveals less than $1 \times 10^6$ cells per milliliter for the drinks made with the purified grape skin extract of this invention. In comparison, a control study is made with grape drinks containing crude Naarden crude grape skin extract; the yeast count is greater than $2 \times 10^7$ cells per milliliter.

EXAMPLE VII

A product pigment extract such as provided by the method substantially set forth in Example VI is dehydrated to provide a pigment powder. The powder exhibits good color and flavor stability.

Thus, the pigment extracts treated in accordance with this invention may be formulated in dry powder mixtures for preparing flavored beverages which, when appropriate amounts of water are added, organoleptically desirable drinks are prepared. These mixtures usually contain one or more of sugar, tartaric acid, pigment, and other dry ingredients and are packaged in sealed pouches. When the pigment extracts treated in accordance with this invention are employed, the mixtures exhibit good color and flavor stability, even during accelerated aging tests when the pouches are exposed to temperatures of about 120° F. On the other hand, when similar mixtures except containing, e.g., the raw dry powder extract used in Example VI, are subjected to the same aging condition, they develop a harsh off-flavor and brown color in about four weeks.

EXAMPLE VIII

The procedure of Example I is essentially repeated except that the extract is subjected to dialysis employing a dialysis membrane obtainable from Spectrum Medical Industries, Inc., instead of the ultrafiltration membrane. The dialysis proceeds by maintaining a concentration gradient of the materials to be separated across the membrane by continuously removing the separated undesirable materials from the permeate side of the membrane by the use of a water purge stream. The purified anthocyanin pigment exhibits good color and oxidation stability and does not support the undue growth of yeasts.

It is claimed:

1. A process for purifying an anthocyanin pigment extract containing undesirable components comprising subjecting the extract to ultrafiltration or dialysis using a semi-permeable membrane having a molecular weight cut-off of about 2,000 to 20,000 daltons, such that low molecular weight components pass through the membrane as permeate and anthocyanin pigments are retained as concentrate and also subjecting said extract to ion exchange to remove ions from said extract, whereby both the ultrafiltration or dialysis and the ion exchange serve to provide a purified anthocyanin pigment extract having enhanced stability and a reduced ability to support growth of yeasts.

2. The process of claim 1 wherein the extract is subjected to ultrafiltration and an ultrafiltration membrane is used.

3. The process of claim 2 wherein the extract is prefiltered to remove colloidal substances and large particle size insolubles prior to being ultrafiltered.

4. The process of claim 3 wherein the extract is at a pH of about 1.0 to 1.5 during ultrafiltration.

5. The process of claim 4 wherein the ultrafiltration membrane has a molecular weight cut-off about 5,000 to 15,000 daltons.

6. The process of claim 2 wherein the ultrafiltration membrane has a molecular weight cut-off of about 5,000 to 15,000 daltons.

7. The process of claim 6 wherein the ion exchange comprises cation exchange.

8. The process of claim 6 wherein the extract is ultrafiltered prior to being subjected to ion exchange.

9. The process of claim 8 wherein the ion exchange comprises cation exchange.

10. The process of claim 8 wherein the extract after being subjected to ion exchange is ultrafiltered using a further ultrafiltration membrane to provide a concentrate containing the anthocyanin pigments.

11. The process of claim 10 wherein the further ultrafiltration membrane has a molecular weight cut-off of about 500 to 5,000 daltons.

12. A carbonated beverage containing as a colorant the anthocyanin pigment extract purified in accordance with the process of claim 10.

13. The anthocyanin pigment extract purified in accordance with the process of claim 10.

14. The anthocyanin pigment extract purified in accordance with the process of claim 10.

15. A carbonated beverage containing as a colorant the anthocyanin pigment extract purified in accordance with the process of claim 2.

16. A dry concentrate for a beverage containing as a colorant the anthocyanin pigment extract purified in accordance with the process of claim 2.

17. The anthocyanin pigment extract purified in accordance with the process of claim 2.

18. A food product containing as a colorant the anthocyanin pigment extract purified in accordance with the process of claim 1.

19. The food product of claim 18 wherein the food is a carbonated beverage.

20. The food product of claim 18 wherein the food is a dry concentrate for a beverage.

21. The anthocyanin pigment extract purified in accordance with the process of claim 1.

22. A process for purifying an anthocyanin pigment extract containing undesirable components comprising subjecting the extract to ultrafiltration or dialysis using a semi-permeable membrane having a molecular weight cut-off such that low molecular weight components pass through the membrane as permeate and anthocyanin pigments are retained as concentrate and also subjecting said extract to ion exchange to remove ions from said extract, whereby both the ultrafiltration or dialysis and the ion exchange serve to provide a purified anthocyanin pigment extract containing less than about 0.005 weight percent calcium, less than about 0.02 weight percent phosphorus, less than 0.6 weight percent of nitrogen, and less than about 0.005 weight percent iron on a solids basis, said pigment extract having enhanced stability and a reduced ability to support growth of yeasts.

* * * * *